Dec. 30, 1930.        G. C. BACON            1,787,231
              SANITATION OF REFRIGERATORS
                   Filed Oct. 25, 1926
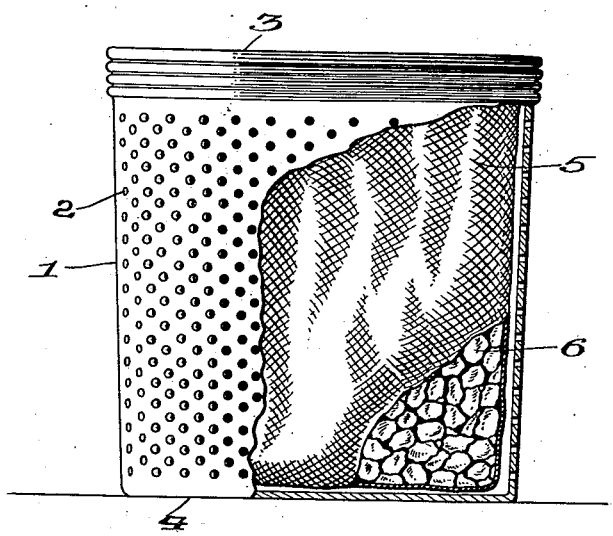
Inventor
GILBERT C. BACON,
By  K. P. McElroy
            Attorney Patented Dec. 30, 1930

1,787,231

UNITED STATES PATENT OFFICE

GILBERT C. BACON, OF TAMAQUA, PENNSYLVANIA, ASSIGNOR TO DARCO CORPORATION, OF WILMINGTON, DELAWARE, A CORPORATION OF DELAWARE

SANITATION OF REFRIGERATORS

Application filed October 25, 1926. Serial No. 144,152.

This invention relates to sanitation of refrigerators; and it comprises means for aiding in maintaining a refrigerator in a sanitary condition, said means including a body of coarse-grained activated carbon, bag means for holding and electrically insulating said body and a perforated container, usually of metal, for holding the bagged body of carbon; and it further comprises a method of aiding maintenance of refrigerators in a sanitary condition which comprises maintaining within said refrigerator a body of activated carbon, said body of activated carbon being in free contact with air and being held as an electrically insulated body by a bag contained in a perforated casing; all as more fully hereinafter set forth and as claimed.

As is well known, household and restaurant refrigerators readily become foul and are difficult to keep odorless and sanitary. Often there is a sort of building up of odors; odors coming from the food and from decomposition. In a refrigerator, convection is active and distribution of odor and taste-giving volatiles is correspondingly rapid. This is objectionable, not only on general principles, but because of contamination of foods. Many foods and particularly those of fatty or oily nature, such as butter, readily adsorb these volatiles. It is the object of the present invention to obviate these conditions and to this end advantage is taken of the convection currents, the atmosphere within the refrigerator being kept sweet by maintaining therein a body of still more adsorbent material—activated carbon. This carbon not only rapidly takes up these odorous volatiles, but disposes of them by oxidation. A small mass of such carbon can be relied upon for maintaining a relatively large refrigerating chamber in a sanitary condition, provided free access of air to the grains is permitted. In the present invention, the body of carbon is used with special holding means giving such access and maintaining the body as a vertical column. In securing this result, certain mechanical and chemical difficulties must be overcome. The ordinary decolorizing carbons on the market are extremely fine in texture and are not well suited for the present purposes. In use in a refrigerator they become moist and free access of air is apt to be precluded. Excess moisture cannot readily drain off. It is therefore better to use a comparatively coarse-grained carbon, say, of about 4 to 10 mesh. Such a carbon may be made by the process set forth and claimed in the Mumford Patent 1,286,187 or in other ways. These carbons are excellent conductors of electricity and their pores are charged with oxygen. They therefore tend to form electric couples with metals and corrode the metal. So, in the present invention, I enclose the body of carbon in an open textured bag, which not only holds the mass in shape, but precludes direct contact with the container. This bag I hold in a perforated container, usually of metal, although containers made of bakelite, vulcanized fiber, hard rubber, etc., may be used. While various metals may be used with the carbon since the bag acts as an insulating layer, I find it best to use aluminum.

In the accompanying illustration I have shown, more or less diagrammatically, an embodiment of my invention; the view being in elevation with a part broken away to show the interior construction. In this drawing 1 represents a perforated metal container made of some non-corroding metal, advantageously aluminum although other metals, such as copper or zinc, may be used. As stated, the container may be made of bakelite, vulcanized fiber or like material, although non-corrodible metals are best for the reason, among others, that the containers may be readily stamped out when such metals are used. Aluminum has the advantage that it is readily kept clean and, because of its surface coating of oxid, it does not readily form galvanic couples. The side walls of the container are perforated, as shown at 2. The bottom 4 of the container 1 is left unperforated, since in ordinary use the container is placed either on the floor or on one of the shelves in the refrigerator, making perforations in the bottom 4 unnecessary. Such drainage as may be necessary in a damp atmosphere is taken care of by the lateral perforations. A perforated removable top 3 permits access to the interior of the container 1. The top 3 is shown as a screw top. A friction top may replace the screw top, if desired. Within the container is placed a cylindrical vertical body or mass of carbon 6 held in a bag 5. This bag may be made of any ordinary porous electrically non-conductive fabric, such as cotton or muslin. While replacement or renewal of the bag of carbon is not necessary for long periods, when it is desirable, the bagged carbon may be readily replaced by another charge. By reason of the active oxidizing properties of good carbon, the life of a charge, under ordinary circumstances, is indefinitely long. Under the circumstances here prevailing, the carbon is kept damp but with its pores full of air and this much conduces to active oxidation of adsorbed volatiles.

I do not regard it as advantageous to place the carbon in direct contact with the perforated container, although this may be done where aluminum, bakelite, vulcanized fiber, or hard rubber is used as the container material. With copper and metals generally, electric actions are apt to take place. Tinned iron rusts very readily in contact with moist, oxygen-adsorbing active carbon.

I consider it important that the carbon used possess a coarse-grained structure. Fine or pulverulent carbons, no matter what their adsorbing or absorbing power may be, are impractical because the contaminated air cannot circulate through them. Furthermore, such carbons have the added disadvantage that, because of their fineness, refilling the bags creates more or less dust. And when fine carbons are used, it is virtually impossible to completely prevent the carbon from coming into contact with the metal container, for the reason that it sifts through the bag.

On the other hand, coarse carbons are marked by cleanliness, permit ready circulation of air, have a tremenduously high power of adsorbing or absorbing impurities from air, ability to retain their adsorbing and absorbing power over long periods, and such carbons may be contained in a relatively coarse-meshed bag, thereby permitting rapid diffusion of the contaminated air.

For an ordinary refrigerator about one-half pound of coarse-grained activated vegetable carbon is a suitable quantity, although any reasonable amount of purifier may be used. The granular carbon may be provided in bags of a size and shape suitable for replacement in the metallic or other container.

What I claim is:—

1. Apparatus for aiding in the sanitation of refrigerators comprising a body of coarse-grained activated carbon and means for holding said body and preventing the formation of a galvanic couple by said carbon, said holding means comprising a perforated container made of oxid-coated aluminum and a bag of electrically non-conductive porous material adapted to hold the carbon and prevent its contact with the walls of the container.

2. Apparatus for aiding in the sanitation of refrigerators comprising a body of coarse-grained activated carbon and means for holding said body and preventing the formation of a galvanic couple by said carbon, said holding means comprising a perforated metal container and a bag of electrically non-conductive porous material adapted to hold the carbon and prevent its contact with the walls of the metal container.

3. Apparatus for aiding in the sanitation of refrigerators which comprises a body of coarse-grained activated carbon and means for holding said body in free communication with the air inside the refrigerator and for preventing the formation of galvanic couples by said carbon, said means comprising a perforated, non-metallic container.

4. Apparatus for aiding in the sanitation of refrigerators which comprises a body of coarse-grained activated carbon and means for holding said body in free communication with the air inside the refrigerator and for preventing the formation of galvanic couples by said carbon, said means comprising a perforated container adapted to prevent electrical contact of said carbon with oxidizable metals.

In testimony whereof, I have hereunto affixed my signature.

GILBERT C. BACON.